United States Patent Office 3,196,851
Patented July 27, 1965

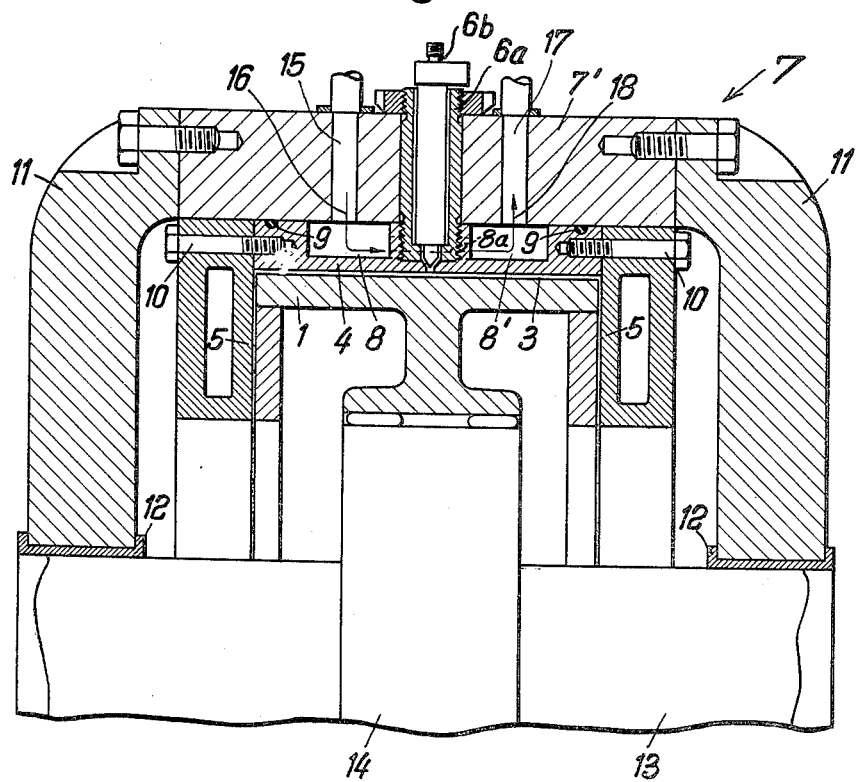

3,196,851
ROTARY PISTON INTERNAL COMBUSTION ENGINE
Georg Jungbluth, Cologne-Deutz, Germany, assignor to Klöckner - Humboldt - Deutz Aktiengesellschaft, Cologne-Deutz, Germany
Filed Sept. 24, 1962, Ser. No. 225,500
Claims priority, application Germany, Nov. 2, 1961, K 45,097
5 Claims. (Cl. 123—8)

The present invention concerns a rotary piston internal combustion engine with an inner rotor which is journalled on an eccentric and is surrounded by an engine body which together with the inner rotor confines working chambers.

The main difficulties heretofore encountered in connection with the production of a satisfactory rotary piston internal combustion engine are caused by the sealing of the working chambers, especially the combustion chamber. For sealing the working chambers and the combustion chamber, the inner rotor is provided with axis parallel apex edges or sealing strips which engage the inner confining surface or running surface of the engine body. The sealing edges give a tight seal only when they engage over their entire length the running surface of the engine body without play. This, however, can be realized only under great difficulties because the engine body, due to the heat freed in the combustion chamber, will be subjected to deformations which particularly affect the running surface of the engine body to such an extent that said running surface, when viewing in the direction of the longitudinal central axis of the inner rotor, will no longer have a rectilinear course.

It is, therefore, an object of the present invention to provide a rotary piston internal combustion engine, which will overcome the above mentioned drawbacks.

It is a further object of this invention to provide a rotary piston internal combustion engine of the type set forth above, in which the wall forming the running surface of the engine body will be freely expandable while undesired deformations, especially arching, will be prevented.

These and other objects and advantages of the invention will appear more clearly from the following specification in connection with the accompanying drawing illustrating a cross section of a portion of a rotary piston internal combustion engine according to the invention.

The invention is characterized primarily in that the housing portion of the engine body which confines the inner rotor in its longitudinal extension comprises a wall forming the running surface to be engaged by the inner rotor, which wall is freely expandable in the direction of the longitudinal central axis of the inner rotor. The wall forming said running surface is connected to lateral walls which form special lateral inner walls and are free from bearing forces.

In conforming with a further development of the invention, it is advantageous firmly to draw said running surface forming wall against the outer housing approximately within the range of half of its length.

The arrangement according to the present invention will permit the running surface forming wall freely to expand while undesired deformations and in particular arching will be prevented. The wall forming the running surface normally has the tendency due to the temperature drop to which it is subjected to arch convexly inwardly. This arching is prevented according to the present invention because the said wall is along its plane of symmetry firmly drawn against the outer housing. This connection brings about that the heat expansion of the wall takes place approximately uniformly toward both sides. By means of the side walls connected to the wall forming the running surface, a proper seal toward the sides will be obtained because no deforming forces can be conveyed into the side walls from the wall forming the running surface. Moreover, the side walls are free from all loads.

The invention comprises an inner housing which confines the inner rotor and forms therewith the working chambers and the combustion chamber. This inner housing merely has the purpose and task of sealing the working chambers and the combustion chamber. The forces will be absorbed by the outer housing portion of the engine body.

According to a further development of the invention, the connection between the wall forming the running surface on one hand and the outer housing on the other hand is provided with an opening for passing therethrough an injection valve or an indicator connection or the like. In this way, the connection between the wall forming the running surface and the outer supporting wall has been exploited for an additional purpose. Thus, the arrangement according to the present invention results in a particularly advantageous design of a rotary piston internal combustion engine.

The nature of the present invention will be more fully understood on reference to the following specification taken in connection with the accompanying drawings in which:

FIGURE 3 is a view like FIGURE 1 but shows a slightly different arrangement of a connector member forming a part of the invention.

Figure 1:
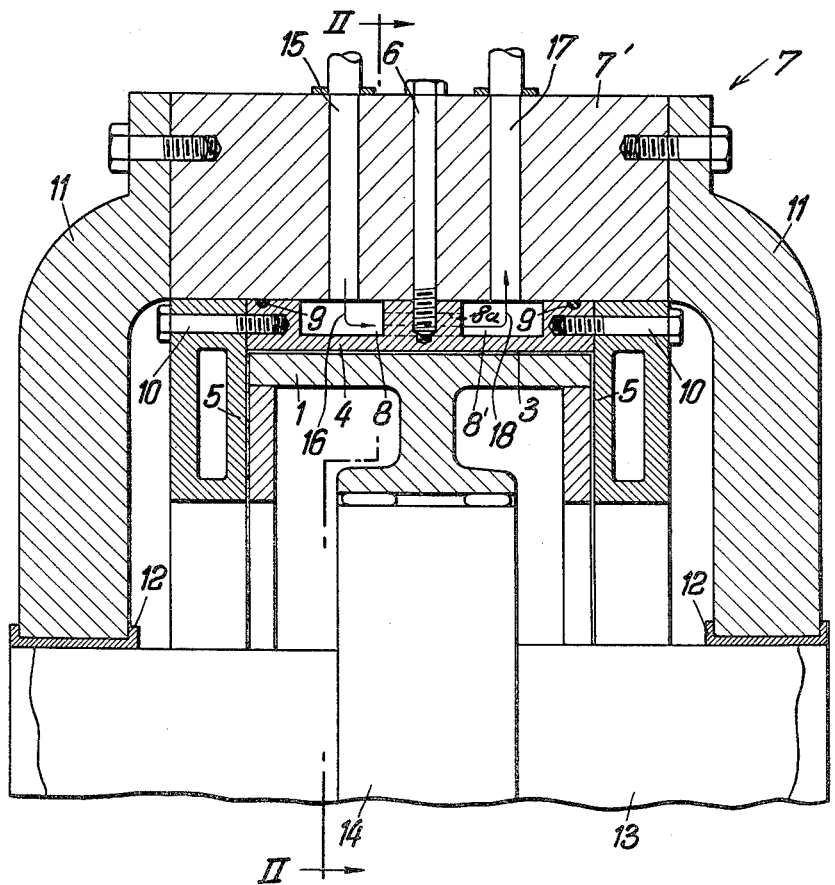
FIGURE 1 is a fragmentary section through one modification of an engine, constructed according to the present invention.

Referring now to the drawing in detail, the rotary piston internal combustion engine illustrated therein represents a circular piston internal combustion engine which comprises an inner rotor 1 rotatable in a stationarry engine body composed of a plurality of parts. The engine body together with the inner rotor 1 confines the working chambers and the combustion chamber of the engine.

Figure 2:
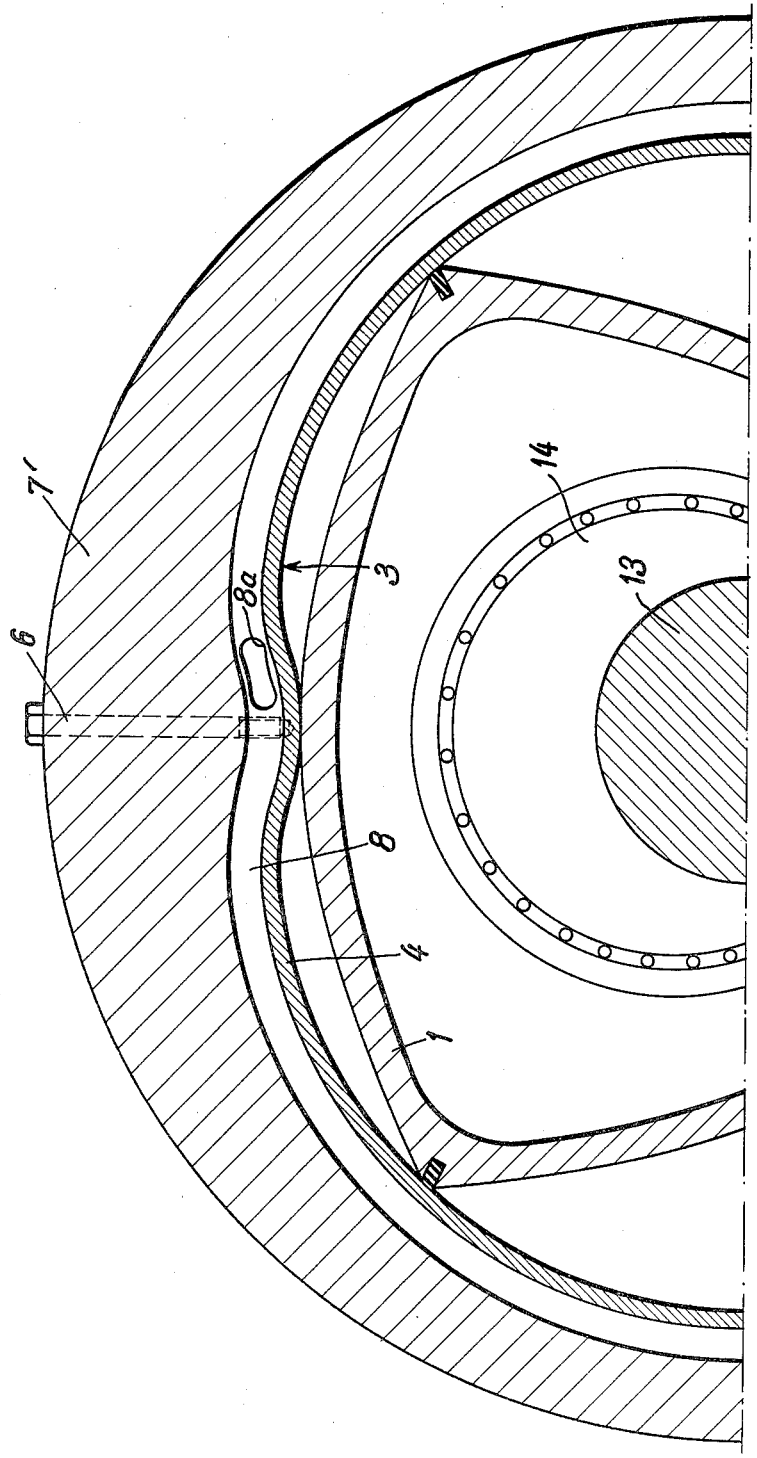
FIGURE 2 is a fragmentary vertical section through the engine indicated by line II—II on FIGURE 1.

The engine illustrated in the FIGURES 1 and 2 is of the type according to which the inner rotor 1 is designed in conformity with the inner developing curve of an epitrochoid. The inner confining surface 3 (FIG. 2) of the engine body represents the epitrochoid. However, it is expressly to be understood that the invention is not limited to the application of an epitrochoid as starting curve for creating a rotary piston internal combustion engine. The invention is also applicable to similar starting curves, for instance when the inner rotor designed in conformity with a hypotrochoid rotates in an engine housing housing the inner confining surface of which is designed in conformity with the outer enveloping curve of the hypotrochoid.

The engine according to the present invention is characterized in that the main peripheral wall member 7' of the engine housing 7 which confines the inner rotor 1 in its longitudinal extension comprises an annular insert member 4 forming the inner confining or running surface 3. Insert member 4 is freely expandable in the direction of the central longitudinal axis of the inner rotor and is connected to the side walls 5. These side walls 5 are special inner walls and are free from bearing forces. Insert member 4 forming the running surface 3 is approximately within the range of half of its length firmly drawn to the outer housing 7 by means of a screw 6. Screw 6 may, according to an advantageous arrangement, shown in FIGURE 3, be designed as a hollow screw piece 6a which may serve for passing therethrough a fuel injection valve 6b for the fuel or for mounting an indicator connection or the like. Between insert member 4 and main peripheral wall member 7' there are chambers 8, 8' for a cooling medium. These chambers 8, 8' which are grooves in the outer surface of insert member 4 are sealed toward the sides by annular seals 9 and communicate with each other through a passage 8a. Said chambers 8, 8' respectively communicate with coolant supply and discharge conduits 15, 17 so that coolant entering chamber 8 through conduit 15 passes along arrow 16 through passage 8a into chamber 8' and leaves the latter along arrow 18 through conduit 17 thereby cooling insert member 4.

The provision of the chambers 8, 8' reduces the stiffness of the main peripheral wall member 4, thereby further reducing the tendency of member 4 to arch inwardly toward the crankshaft as the engine becomes heated.

The connection of the side walls 5 with insert member 4 is effected by screws 19. The main peripheral wall member 7' together with the outer side wall members 11 form the supporting housing 7 for the rotary piston internal combustion engine. In these outer side wall members 11 there are provided the bearings 12 in which the crankshaft 13 with the eccentric 14 is journalled. As will be seen from the drawing, the inner rotor 1 is mounted on the eccentric 14.

It is, of course, to be understood that the present invention is, by no means, limited to the particular construction shown in the drawings but also comprises any modifications within the scope of the appended claims.

What I claim is:

1. A rotary piston internal combustion engine which comprises: a first engine member forming a supporting housing including a main peripheral wall member disposed about an axis and also including outer side wall members respectively connected to the axially opposite sides of said main peripheral wall member, a crankshaft rotatably journalled in said outer side wall members and having an eccentric, a second engine member rotatably mounted on said eccentric and rotatable relative to said first engine member, and a relatively thin annular insert member fitted into said housing and surrounding said second engine member and having an inner running surface slidably engaged by portions of said second engine member, said insert member and said second engine member cooperating to form working chambers, said insert member being connected to said main wall member in a single axially short annular region only so as to be freely expandable in the direction of the longitudinal axis of said crankshaft, and side wall means independent of and axially spaced from said outer side wall members, said side wall means being respectively in face to face contact with and connected to the axial end faces of said insert member only, said side wall means confining therebetween the axial end face portions of said second engine member and forming the axial ends of said working chambers.

2. An internal combustion engine according to claim 1, in which said annular region extends along the central peripheral portion only of said insert member.

3. A rotary piston internal combustion engine according to claim 2 in which said insert member has annular groove means formed therein about the outer surface thereof on opposite sides of said annular region whereby the stiffness of said insert member is reduced.

4. A rotary piston internal combustion engine according to claim 3 in which conduit means for cooling fluid extends through said housing and communicates with said groove means.

5. A rotary piston internal combustion engine which comprises: a first engine member forming a supporting housing including a main peripheral wall member disposed about an axis and also including outer side wall members respectively connected to the axially opposite sides of said man peripheral wall member, a crankshaft rotatably journalled in said outer side wall members and having an eccentric, a second engine member rotatably mounted on said eccentric and rotatable relative to said first engine member, a relatively thin annular insert member fitted into said housing and surrounding said second engine member and having an inner running surface slidably engaged by portions of said second engine member, said insert member and said second engine member cooperating to form working chambers, tubular connecting means extending through the housing and connected to said insert member in a central annular region only thereof to connect said insert member to said main wall member so as to permit said insert member freely to expand in the direction of extension of the longitudinal axis of said crankshaft while preventing the central portion of the insert member from arching inwardly toward said crankshaft when heated, fuel injection means extending through said connecting means, and outer side wall means independent of said side wall members and said side wall means being respectively in face to face engagement with and connected to the end faces of said insert member only while confining therebetween and face portions of said second engine member and forming the axial ends of said working chambers.

References Cited by the Examiner

UNITED STATES PATENTS

| | | | |
|---|---|---|---|
| 1,819,759 | 8/31 | Valletta | 92—169 |
| 2,674,988 | 4/54 | Evans et al. | 92—169 |
| 2,947,290 | 8/60 | Froede | 123—8 |

KARL J. ALBRECHT, *Primary Examiner.*

JOSEPH H. BRANSON, JR., *Examiner.*